(12) United States Patent
Spitzer

(10) Patent No.: US 7,499,472 B2
(45) Date of Patent: Mar. 3, 2009

(54) JITTER BUFFER MANAGEMENT

(75) Inventor: Andy Spitzer, North Andover, MA (US)

(73) Assignee: Dialogic Corporation, Montreal, Quebec (CA)

( * ) Notice: Subject to any disclaimer, the term of this patent is extended or adjusted under 35 U.S.C. 154(b) by 677 days.

(21) Appl. No.: 11/076,815

(22) Filed: Mar. 10, 2005

(65) Prior Publication Data

US 2005/0207437 A1  Sep. 22, 2005

Related U.S. Application Data

(60) Provisional application No. 60/554,024, filed on Mar. 16, 2004.

(51) Int. Cl.
*H04J 3/07* (2006.01)
*H04J 3/06* (2006.01)

(52) U.S. Cl. .................................. 370/505; 370/516

(58) Field of Classification Search .................. None
See application file for complete search history.

(56) References Cited

U.S. PATENT DOCUMENTS

| | | | | |
|---|---|---|---|---|
| 6,088,412 | A * | 7/2000 | Ott | 375/372 |
| 6,658,027 | B1 | 12/2003 | Kramer et al. | 370/516 |
| 6,859,460 | B1 * | 2/2005 | Chen | 370/412 |
| 6,980,569 | B1 * | 12/2005 | Beyda et al. | 370/516 |
| 7,006,511 | B2 * | 2/2006 | Lanzafame et al. | 370/412 |
| 7,027,456 | B1 * | 4/2006 | Chen | 370/412 |
| 7,180,892 | B1 * | 2/2007 | Tackin | 370/389 |
| 2002/0018474 | A1 | 2/2002 | Assa et al. | 370/395.71 |
| 2003/0169755 | A1 * | 9/2003 | Ternovsky | 370/412 |
| 2003/0202528 | A1 * | 10/2003 | Eckberg | 370/412 |
| 2004/0022260 | A1 | 2/2004 | Rosengard et al. | 370/412 |
| 2004/0032827 | A1 | 2/2004 | Hill et al. | 370/229 |
| 2004/0057445 | A1 * | 3/2004 | LeBlanc | 370/412 |
| 2004/0081106 | A1 * | 4/2004 | Bruhn | 370/276 |

OTHER PUBLICATIONS

Schulzrinne et al., "A Transport Protocol for Real-Time Applications," RFC 3550, http://www.rfc-editor.org/rfc/rfc3550.txt, Jul. 2003.

OTHER PUBLICATIONS

LeBoudec et al., "Real Time Protocol (RTP)," CH-1014, Ecublens, http://icapeople.epfl.ch/thiran/CoursED/RTP.pdf, undated.

* cited by examiner

*Primary Examiner*—Wing F Chan
*Assistant Examiner*—Eunsook Choi
(74) *Attorney, Agent, or Firm*—Weingarten, Schurgin, Gagnebin & Lebovici LLP

(57) ABSTRACT

A sample jitter buffer manager more or less aggressively conserves (rations) or discards data in a jitter buffer, based on the fluctuating amount of data in the jitter buffer. The jitter buffer manager counts, provides, discards and/or otherwise manages individual sample data units, rather than entire packets. Normally, enough data is removed from the jitter buffer to fill a data packet for a receiver. However, if the amount of data in the jitter buffer is low, less data is removed from the jitter buffer and placed into the packet, and the remainder of the packet is filled with duplicates of some of the data in the packet or in the jitter buffer. As the jitter buffer fills beyond a useful level, the jitter buffer discards progressively larger amounts of data, without necessarily discarding one or more entire packets. This fine-grained management of the amount of data in the jitter buffer maintains a buffer size that can provide a steady stream of packets to the receiver, without significantly impacting the fidelity of a signal represented by the data, and it mitigates the impact of fluctuations in packet inter-arrival times.

69 Claims, 7 Drawing Sheets

JITTER BUFFER MANAGEMENT

CROSS REFERENCE TO RELATED APPLICATIONS

This application claims the benefit of U.S. Provisional Patent Application No. 60/554,024, filed Mar. 16, 2004, titled "A Method for Jitter Buffer Management."

STATEMENT REGARDING FEDERALLY SPONSORED RESEARCH OR DEVELOPMENT (Not applicable)

BACKGROUND OF THE INVENTION

The present invention relates to computer network jitter buffers and, more particularly, to jitter buffers that discard sample data or replicate sample data when the jitter buffers contain too much or too little sample data, respectively.

Packet-switched networks (such as local area networks (LANs) or the Internet) can be used to carry audio, video or other continuous signals, such as Internet telephony or video conferencing signals. In such an application, a sender and a receiver typically communicate with each other according to a protocol, such as the Real-time Transport Protocol (RTP), which is described in RFC 3550. The sender digitizes the continuous input signal, such as by sampling the signal at fixed or variable intervals. The sender sends a series of packets over the network to the receiver. Each packet contains data representing one or more discrete signal samples. (Sometimes, data representing a segment, such as a 10 millisecond segment, of the signal is referred to as a "sample," even though such a sample includes many discrete digitized values. Discrete digitized values are referred to herein as "samples" or "sample data units," which can be 8-bit bytes or other size data units.) The sender typically sends the packets at regular time intervals. The receiver reconstructs the continuous signal from the received samples and typically outputs the reconstructed signal, such as through a speaker or on a screen of a computer.

Optionally, the sender uses a compressor-decompressor (codec) to compress (also commonly referred to as "code") the samples before sending the packets to the receiver. If the sender uses a codec, the receiver uses a compatible codec to decompress (decode) the samples before reconstructing the signal.

Senders and receivers use clocks to govern the rates at which they process data, however these clocks are typically not synchronized and typically operate at different speeds. This difference can cause a sender to send packets too frequently or not frequently enough, from a receiver's point of view, thereby causing the receiver's buffer to overflow or underflow. Furthermore, the Internet and most other networks, over which such real-time packets are sent, introduce variable and unpredictable propagation delays, which cause the packets to arrive at the receiver with variable and unpredictable inter-arrival times. This phenomenon is commonly referred to as "jitter."

A jitter buffer is commonly used to compensate for differences in clock speeds between transmitters and receivers and variations in inter-arrival times of packets. A jitter buffer is an elastic store that accepts received packets whenever they arrive. Once the jitter buffer contains several packets, it begins supplying the packets to the receiver at a fixed rate. Generally, the elasticity of the jitter buffer enables the buffer to continue supplying packets to the receiver at the fixed rate, even if the packets from the sender arrive at the jitter buffer at a variable rate or no packets arrive for a short period of time.

However, if no or insufficient packets arrive at the jitter buffer for an extended period of time (as can occur if, for example, the network becomes congested), the buffer can become empty ("underflow"). An empty jitter buffer can not provide packets to the receiver, which causes an undesirable gap in the otherwise continuous signal output by the receiver until another packet arrives from the receiver. Such a gap is manifested as silence in an audio signal or as a blank or "frozen" screen in a video signal.

On the other hand, if more packets arrive at the jitter buffer over a short period of time than the buffer can accommodate (as can occur if, for example, a congested network suddenly becomes less busy), the jitter buffer can "overflow" and discard some of the arriving packets. This causes a loss of one or more entire packets of samples, which can cause an undesirable discontinuity or "jump" in the otherwise continuous signal output by the receiver.

A so-called "adaptive" jitter buffer can expand and contract (within limits), depending on the arrival rate of the packets. Although an adaptive jitter buffer is less likely to overflow than a fixed-size jitter buffer, an adaptive jitter buffer can experience underflow and cause the above-described gaps in the signal output by the receiver.

BRIEF SUMMARY OF THE INVENTION

The present invention provides methods and apparatus for managing jitter buffers in ways that reduce the likelihood of underflow or overflow of the buffers and that mitigate the impact on signals produced by receivers in the event of fluctuations in the inter-arrival times of packets at the jitter buffers. Embodiments of the present invention monitor and control data in jitter buffers with more resolution than in conventional jitter buffers. For example, in one embodiment, a jitter buffer can buffer, count, provide, discard and otherwise manage individual bytes, samples or other sample data units, rather than entire packets.

Under normal circumstances, when the subject jitter buffer is called upon to provide a packet of data to a receiver, enough data is removed from the jitter buffer to fill the data packet, and the packet is provided to the receiver. However, if network congestion has temporarily stopped or slowed the delivery of packets to the jitter buffer, or for some other reason the amount of data in the jitter buffer is low, less data is removed from the jitter buffer and placed into the packet for the receiver, and the remainder of the packet is filled with duplicates of some of the data in the packet or in the jitter buffer. Thus, the available data in the jitter buffer is "rationed" to "spread" the available data over more packets and, thus, supply more packets (albeit with some duplication of data) to the receiver than under normal circumstances.

Consequently, the jitter buffer does not become empty as quickly as it would under conventional jitter buffer management. This provides a steady stream of packets to the receiver while providing additional time for the network to decongest and/or for the jitter buffer to receive additional packets. The small amount of data duplication does not significantly effect the fidelity of the signal reproduced by the receiver. The ratio of the amount of duplicated data in the packet to the amount of data taken from the jitter buffer can be dynamically adjusted each time a packet is provided to the receiver, based on the amount of data then in the jitter buffer. Thus, as the amount of data in the jitter buffer decreases, the available data is spread over a larger number of packets, and as the amount of data in the jitter buffer increases, more data (up to a whole packet) is removed from the jitter buffer for each packet provided to the receiver.

On the other hand, if the jitter buffer fills beyond a useful level, the jitter buffer discards progressively larger amounts of data, without necessarily discarding one or more entire packets' worth of data. For example, one or more sample data units can be discarded each time a packet is provided to the receiver and/or at other times. Discarding small amounts of sample data, rather than entire packets, avoids creating large discontinuities in the signal. Furthermore, data at disparate locations within the jitter buffer can be selected for discard, thus avoiding significant discontinuities in the signal.

Thus, embodiments of the present invention more or less aggressively conserve (ration) or discard data in the jitter buffer, based on the fluctuating amount of data in the jitter buffer. This fine-grained management of the amount of data in the jitter buffer maintains a buffer size that can provide a steady stream of packets to the receiver, without requiring excessive storage capacity and without significantly impacting the fidelity of the signal.

These and other features, advantages, aspects and embodiments of the present invention will become more apparent to those skilled in the art from the Detailed Description of the Invention that follows.

BRIEF DESCRIPTION OF THE SEVERAL VIEWS OF THE DRAWINGS

The invention will be more fully understood by referring to the Detailed Description of the Invention in conjunction with the Drawings, of which.

DETAILED DESCRIPTION OF THE INVENTION

The contents of U.S. Provisional Patent Application No. 60/554,024, filed Mar. 16, 2004, titled "A Method for Jitter Buffer Management," are hereby incorporated by reference herein.

Methods and apparatus are described herein for managing jitter buffers in ways that reduce the likelihood of underflow or overflow of the buffers and that mitigate the impact on signals produced by receivers in the event of fluctuations in inter-arrival times of packets at the jitter buffers. The presently disclosed system monitors and controls data in sample jitter buffers with more resolution than in conventional jitter buffers. For example, the disclosed sample jitter buffers can buffer, count, provide, discard and otherwise manage individual bytes, samples or other sample data units, rather than entire packets. Jitter buffers according to the present invention are referred to herein as "sample jitter buffers."

Figure 1:
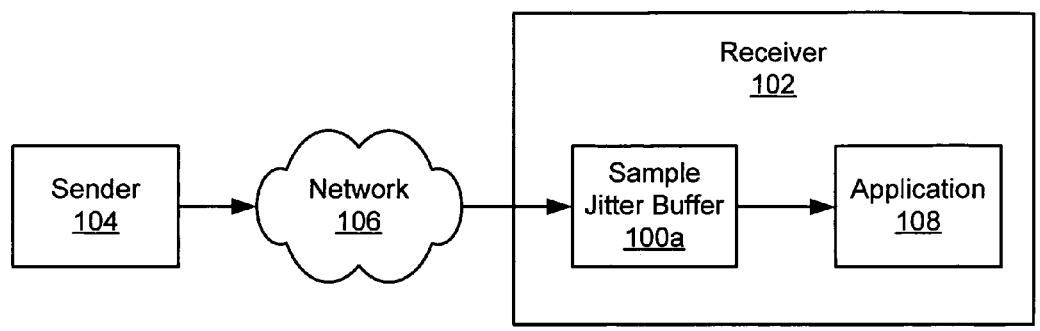
FIG. 1 is block diagram of an exemplary context in which one embodiment of the present invention can be practiced.

FIG. 1 illustrates an exemplary system in which one embodiment of a sample jitter buffer 100a can be used. In this embodiment, the sample jitter buffer 100a is part of a receiver 102. A sender 104 digitizes a continuous input signal (not shown) and sends a series of packets containing digitized samples of the input signal over a network 106, typically according to a real-time protocol, to the receiver 102. The sample jitter buffer 100a receives the packets (groups of data) and buffers the digitized samples (data) from the packets.

In this embodiment, the receiver 102 includes an application 108. The sample jitter buffer 100a provides data to the application 108 at regular time intervals or upon request. The data can be provided to the application 108 in packets that are the same size as the packets sent by the sender 104 or in other size packets, as needed. Alternatively, the data is provided to the application 108 in a "raw" format, i.e. without packetizing the data. The data can be provided to the application 108 according to the real-time protocol used to communicate with the sender 104, or a different protocol can be used.

Figure 2:
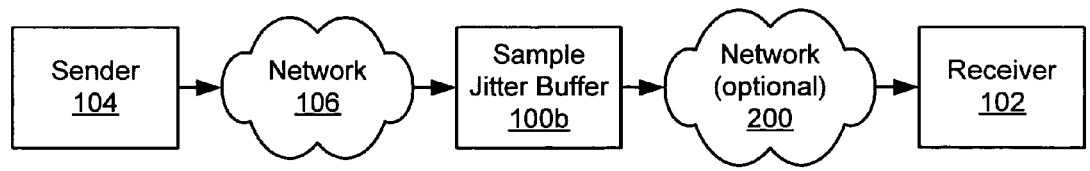
FIG. 2 is a block diagram of an exemplary context in which another embodiment of the present invention can be practiced.

FIG. 2 illustrates an exemplary context in which another embodiment of the sample jitter buffer 100b can be used. In this embodiment, the sample jitter buffer 100b is interposed between the network 106 and the receiver 102. The sample jitter buffer 100b can be connected directly (not shown) to the receiver 102 or (as shown in FIG. 2) via a network 200, such as a via low-jitter network. In this embodiment, the sample jitter buffer 100b sends to the receiver 102 packets that are the same size as the packets sent by the sender 104, using the same real-time protocol used by the sender 104. Alternatively, the sample jitter buffer 100b can send packets of other sizes to the receiver 102 and/or communicate with the receiver using a different protocol.

In either embodiment, the sender 104 can compress (code) the sample data before sending packets containing the compressed data to the sample jitter buffer 100a or sample jitter buffer 100b (hereinafter collectively referred to as sample jitter buffer 100). In these cases, the sample jitter buffer 100 decompresses (decodes) the data before buffering the data, as described in more detail below. Optionally, the sample jitter buffer 100 compresses the data before providing the (compressed) data to the application 108 (FIG. 1) or to the receiver 102 (FIG. 2), as applicable.

As noted, the disclosed system monitors and controls data in sample jitter buffers with more resolution than in conventional jitter buffers. For example, a sample jitter buffer can buffer, count, provide, discard and otherwise manage individual bytes, samples or other sample data units, rather than entire packets. When a sample jitter buffer receives a packet of data, the sample jitter buffer extracts the data from the packet (decompressing the data, if necessary) and handles the sample data units individually, rather than as a packet.

Figure 3:
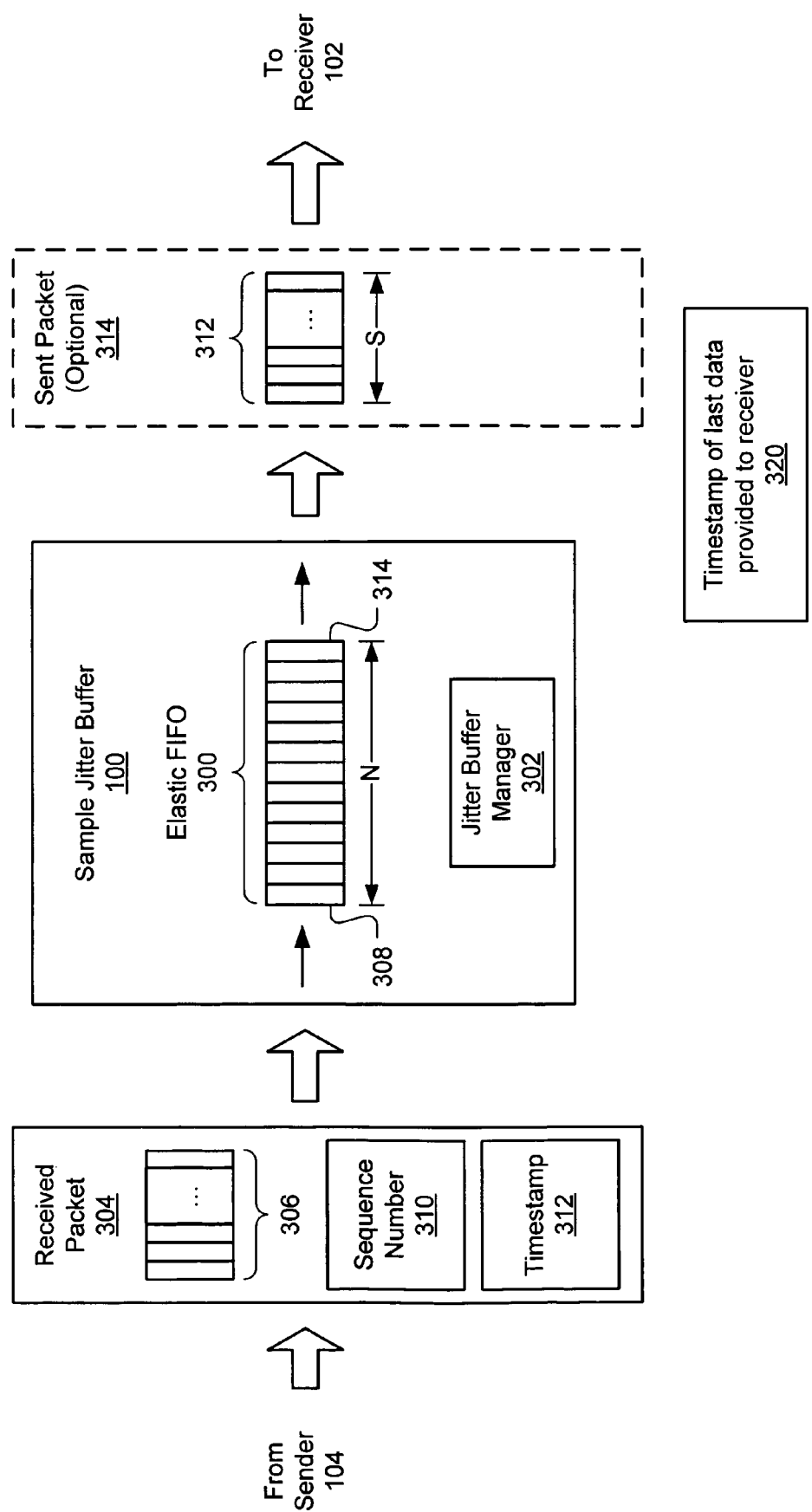
FIG. 3 is a block diagram of one embodiment of a sample jitter buffer, according to the present invention.

FIG. 3 is a block diagram of a sample jitter buffer 100 that illustrates some of the operations performed by the sample jitter buffer. The sample jitter buffer 100 includes an elastic first-in/first-out store (FIFO) 300 and a jitter buffer manager 302. The FIFO 300 can be implemented with a ring buffer, as discussed in more detail below, or with any other suitable software or hardware structure. Each cell of the FIFO 300 can store one sample data unit. Dimension N indicates the number of sample data units currently stored in the FIFO 300.

Figure 4:
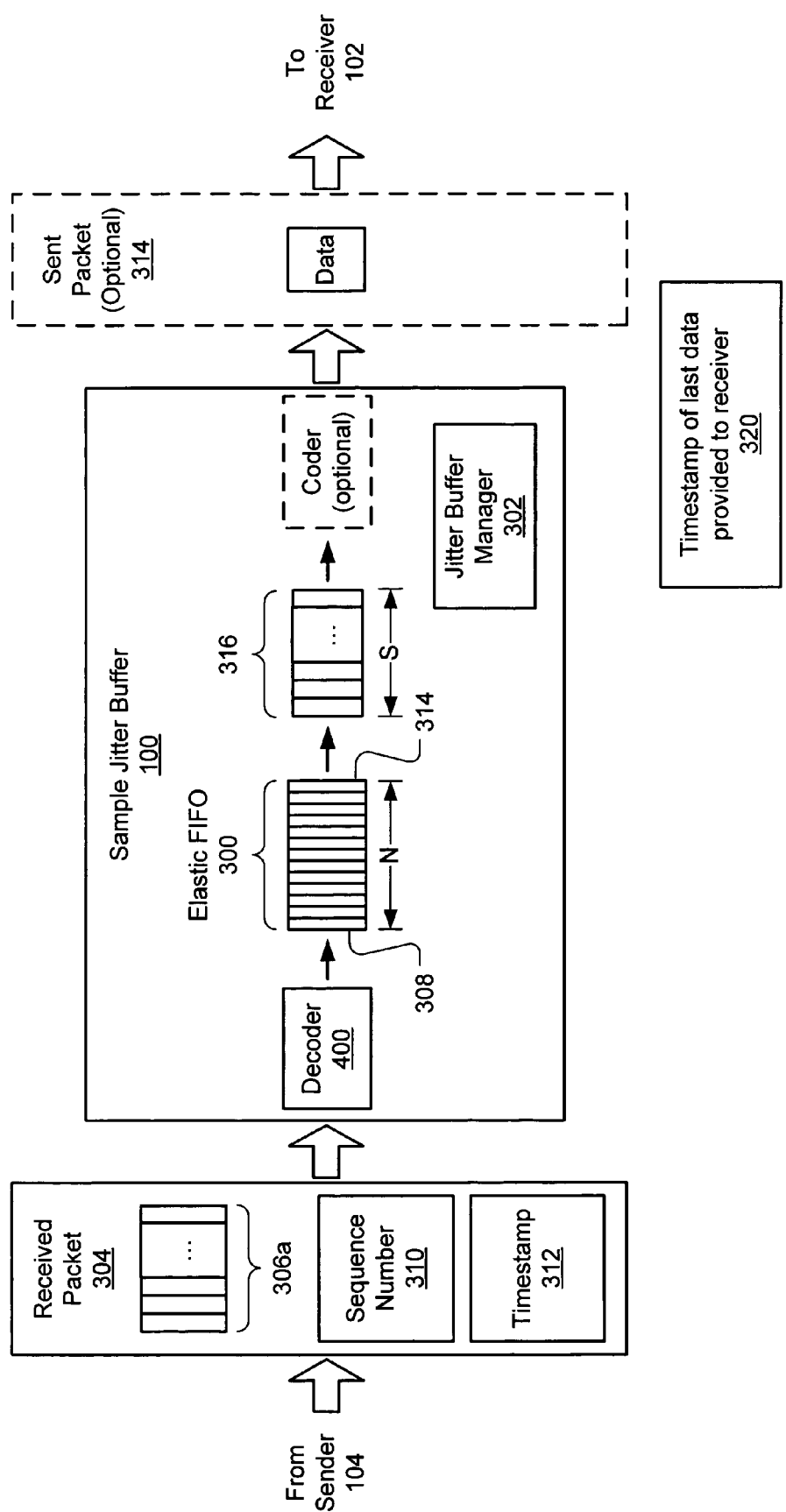
FIG. 4 is a block diagram of another embodiment of a sample jitter buffer, according to the present invention.

When the sample jitter buffer 100 receives a packet, such as packet 304, the packet's sample data 306 is added to the FIFO 300. As shown in FIG. 4, if the received sample data 306a was compressed (coded) by the sender 104, an appropriate codec 400 is used to a decompress (decode) the received sample data 306a before it is added to the FIFO 300. Uncompressed data and some compression algorithms (such as G.726 and G.729) yield a fixed number of sample data units per time unit of input signal. Other compression algorithms (such as AMR and MP3) yield a variable number of sample data units per time unit of input signal. Thus, although each received packet 304 typically represents a fixed amount (in time) of the input signal, the number of sample data units in the packet 304 can vary from packet to packet.

In general, newly arrived sample data units are added to the tail 308 of the FIFO 300. However, due to different network paths taken by various packets or other network routing anomalies, sometimes packets arrive out of order. The jitter buffer manager 302 can use the packet's sequence number 310, timestamp 312 or any suitable method to determine if the newly arrived packet 304 is in (or out) of order. If the packet 304 is out of order, the jitter buffer manager 302 does not add the received sample data 306 (or the decompressed received sample data 306a) to the tail 308 of the FIFO 300. Instead, the jitter buffer manager 302 uses the packet's timestamp 312 and/or sequence number 310 to insert the (decompressed, if necessary) received sample data 306(a) in the proper time-based position in the FIFO 300. That is, the received sample data 306(a) is inserted between sample data in the FIFO 300 that has a timestamp before the timestamp of the received sample data 306(a) and other sample data in the FIFO that has a timestamp after the timestamp of the received sample data. Thus, sample data is stored in the FIFO 300 in timestamp order, with the oldest (smallest timestamp) sample data at the head 314 of the FIFO, and the newest (largest timestamp) sample data at the tail 308 of the FIFO.

If the packet 304 does not include a timestamp, any suitable method can be used to properly place the received sample data 306(a) into the FIFO 300 in time order. For example, a timestamp can be synthesized. If each packet represents a fixed-length (time) segment of the input signal, a timestamp for the packet 304 can be calculated by multiplying the packet's sequence number 310 by the length (in time) of the segment of input signal represented by the packet. If each packet 304 represents a variable-length segment of the input signal, the sample data 306a in the packet is decompressed (decoded) to produce a series of sample data units that each represent a fixed-length (time) segment of the input signal. In this case, a timestamp for the packet 304 can be calculated by multiplying the number of these sample data units, the length (in time) of the segment of the input signal represented by each sample data unit and the packet's sequence number 310.

For example, if the sample data 306 is uncompressed, or the sample data is compressed according to an algorithm that yields a fixed number of sample data units per time unit of input signal, a timestamp can be calculated by multiplying the packet's sequence number 310 by the length (in time) of the segment of the input signal represented by the sample data 306.

Similarly, a timestamp can be calculated for each sample data unit in the received sample data 306 by using the position of the sample data unit within the received sample data (or the position of the decompressed sample data unit within the set of decompressed sample data, once the received sample data 306a has been decompressed). Optionally, each cell of the FIFO 300 also stores a timestamp for the corresponding sample data unit.

The sample jitter buffer 100 provides sample data 316 to the application 108 or to the receiver 102 (collectively hereinafter referred to as the receiver 102) at regular time intervals or upon request. As noted, the sample data 316 can be provided in a raw format or in an optional packet 318. In either case, dimension S indicates the number of sample data units (before compression, if necessary) provided by the sample data buffer 100. Generally, S sample data units are removed from the head 314 of the FIFO 300 and provided to the receiver 102. However, as discussed below, more or fewer than S sample data units can be removed from the head 314 of the FIFO 300. The jitter buffer manager 302 maintains a timestamp 320 of the last sample data unit provided to the receiver 102. Each time the sample jitter buffer 100 provides sample data 316 to the receiver 102, the timestamp 320 is updated.

Some or all of the sample data 306(a) in a received packet 304 may arrive at the sample jitter buffer 100 too late to be provided to the receiver 102. If a sample data unit arrives at the sample jitter buffer 100, but the sample jitter buffer has already provided to the receiver 102 a sample data unit that is newer (has a larger timestamp) than the newly arrived sample data unit, the newly arrived sample data unit is not added to the FIFO 300. Instead, the newly arrived sample data unit, and any yet older sample data units in the same received packet 304, are discarded. For example, if the newly received packet 304 arrives out of order, the FIFO 300 may have earlier stored newer data, and the sample jitter buffer 100 may have already provided to the receiver 102 the newer sample data, i.e. sample data having a larger timestamp than the newly received sample data 306(a). (Sample data that arrives at the sample jitter buffer 100 too late to be provided to the receiver 102 is referred to herein as "late data.")

When the sample jitter buffer 100 receives a packet 304, the jitter buffer manager 302 consults the timestamp 320 of the last sample data unit provided to the receiver 102 and the timestamp of the received sample data 306(a) to ascertain how much, if any, of the received sample data is late data. The late data is discarded, without adding the late data to the FIFO 300. The remaining received sample data 306(a) is placed into the proper time-based position within the FIFO 300.

Although the sample jitter buffer 100 can provide raw (unpacketized) data to the receiver 102, for simplicity, in the following description, data will be referred to as being provided to the receiver in packets. In general, the amount of data 316 provided to the receiver 102 remains constant from packet the packet. That is, for uncompressed data and for fixed-rate compression algorithms, a fixed number of sample data units are provided (or compressed and provided) to the receiver 102 for each packet. For variable-rate compression algorithms, enough sample data units are compressed to provide the receiver 102 with a fixed-length (time) segment of the signal. As noted, with variable-rate compression algorithms, the number of sample data units needed to create a fixed-length (time) segment of the signal for the receiver 102 can vary from packet to packet. Optionally, the FIFO 300 can provide a variable amount of data 316 in the packets to the receiver 102.

In general, the amount of data provided in a packet to the receiver 102 is the same as the amount of data received in a packet from the sender 104. That is, the length (duration) of the portion of the signal represented by the packet sent to the receiver 102 is the same as the length (duration) of the portion of the signal represented by the packet received from the sender 104. Alternatively, the amount of data provided in a packet to the receiver 102 can be different than the amount of data received in a packet from the sender 104.

The number of sample data units needed to create a packet for the receiver 102 is referred to herein as S, regardless of whether the data is uncompressed, compressed according to a fixed-rate compression algorithm or compressed according to a variable-rate compression algorithm. Thus, S sample data units are used to create a packet for the receiver 102, although the actual value of S can vary from packet to packet. However, depending on the number N of sample data units in the FIFO 300, exactly S, more than S or fewer than S sample data units are removed from the FIFO 300 to create the packet for the receiver 102.

Figure 5:
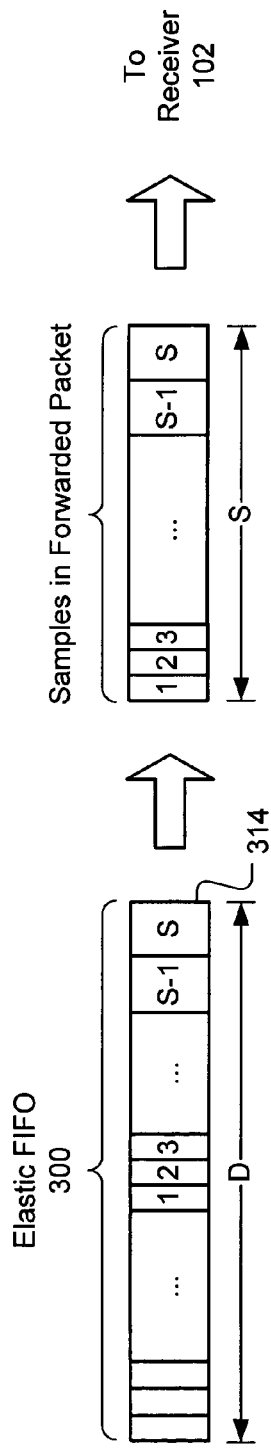
FIGS. 5-8 are data flow diagrams illustrating operations of the sample jitter buffers of FIGS. 3 and 4.
Figure 6:
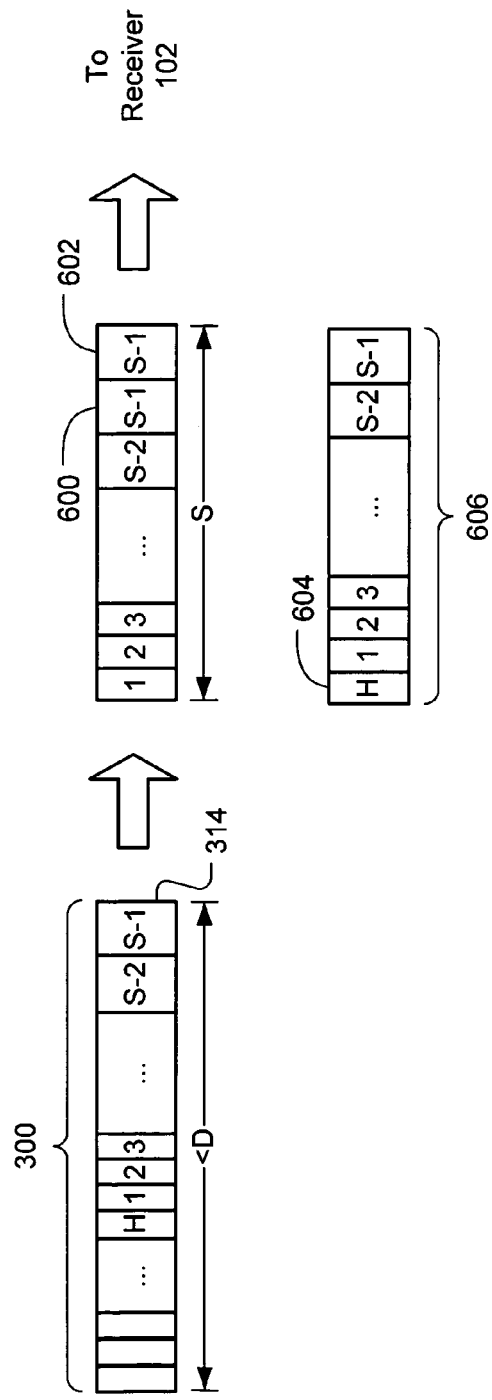
Figure 7:
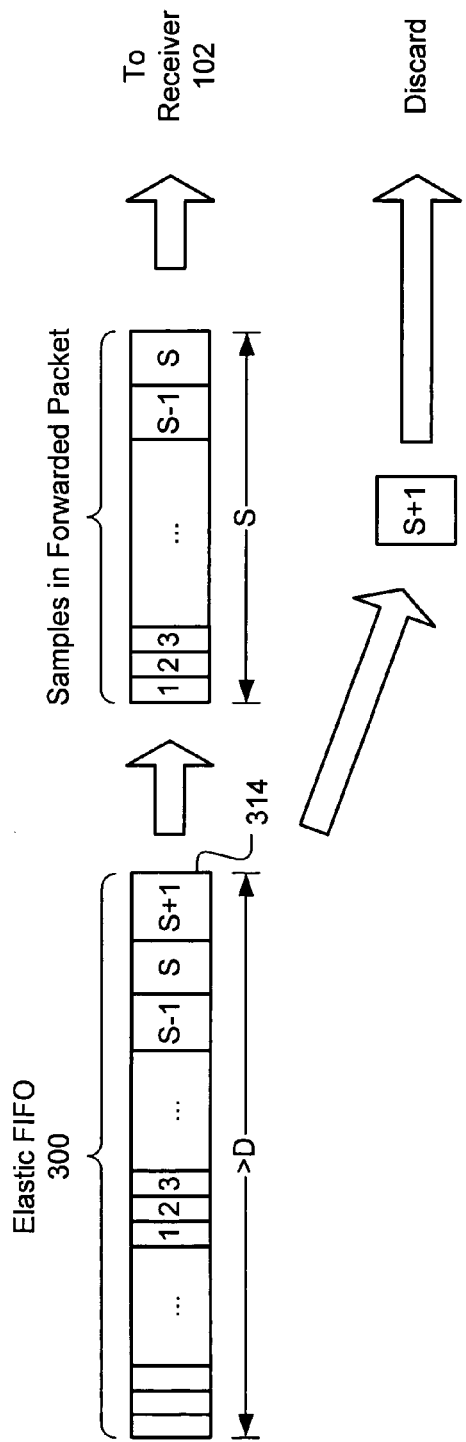

The operation of one embodiment is illustrated in FIGS. 5-7. A desired number D of sample data units in FIFO 300 is determined. In one embodiment, D is an integral multiple of the receiver's natural packet size. Alternatively, the multiplier need not be an integer. The multiplier can be selected based on the expected or actually measured jitter rate of the network 106, or by any other suitable method. The multiplier can be static or dynamic. As shown in FIG. 5, if the FIFO 300 contains D sample data units, the jitter buffer manager 302 removes S sample data units from the head 314 of the FIFO 300. The jitter buffer manager 302 compresses (if necessary) and provides these S sample data units to the receiver 102.

As shown in FIG. 6, if the FIFO 300 contains fewer than D sample data units, the jitter buffer manager 302 removes fewer than S sample data units from the head 314 of the FIFO 300. For example, one fewer than S sample data units are removed. The jitter buffer manager 302 repeats one of the sample data units (S−1) that was removed from the FIFO 300, i.e. the jitter buffer manager provided the sample data unit (S−1) twice, (with or without compression) to the receiver 102, as indicated at 600 and 602. The repeated sample data unit 602 is referred to as an "added" sample data unit. The repeated sample data unit 602 is inserted in the packet at a position that most closely approximates the sample data unit's timestamp.

Thus, although a full packet of data is provided to the receiver 102, less than a full packet of data is removed from the FIFO 300. This rations (spreads) the available sample data units in the FIFO 300 over a larger number of packets. The small amount of data duplication (i.e. the added sample data unit 602) does not significantly affect the fidelity of the signal produced by the receiver 102.

Alternatively, instead of repeating one of the sample data units that was removed from the FIFO 300, a sample data unit that is still in the FIFO can be copied and used as the added sample data unit. For example, after sample data units 1, 2, 3, . . . (S−1) have been removed from the FIFO 300, sample data unit H would be at the head 314 of the FIFO. Sample data unit H can be copied and provided (with or without compression) to the receiver 102, without removing the sample data unit H from the FIFO 300. The added sample data unit 604 is inserted in the packet at a position that most closely approximates the sample data unit's timestamp. In this case, the sample data unit H will also be provided to the receiver 102 in a subsequent packet. Thus, although the data 606 provided to the receiver 102 in a single packet does not contain two copies of any single sample data unit, a subset of the sample data units in the FIFO 300 are provided to the receiver, and at least one sample data unit H is repeated over the course of two or more successive packets provided to the receiver. "Repeating" data means providing the data more than once, whether the data is repeated in a single packet or repeated over the course of two or more packets.

As shown in FIG. 7, if the FIFO 300 contains more than D sample data units, the jitter buffer manager 302 removes more than S sample data units from the head 314 of the FIFO 300. For example, one more than S sample data units are removed. The jitter buffer manager discards one of the removed sample data units. S sample data units are provided (with or without compression) to the receiver 102. Thus, a full packet of data is provided to the receiver 102, and a single sample data unit is discarded. The loss of a single sample data unit does not significantly affect the fidelity of the signal produced by the receiver 102. Furthermore, the number of sample data units in FIFO 300 can be maintained at a preferred value without discarding an entire packet of data.

Thus, D can be considered a predetermined threshold value. In addition, if the FIFO 300 contains D sample data units, the FIFO can be considered to meet a criterion. If the FIFO 300 contains fewer than D sample data units, the FIFO can be considered to meet another criterion. Similarly, if the FIFO 300 contains more than D sample data units, the FIFO can be considered to meet yet another criterion.

Figure 8:
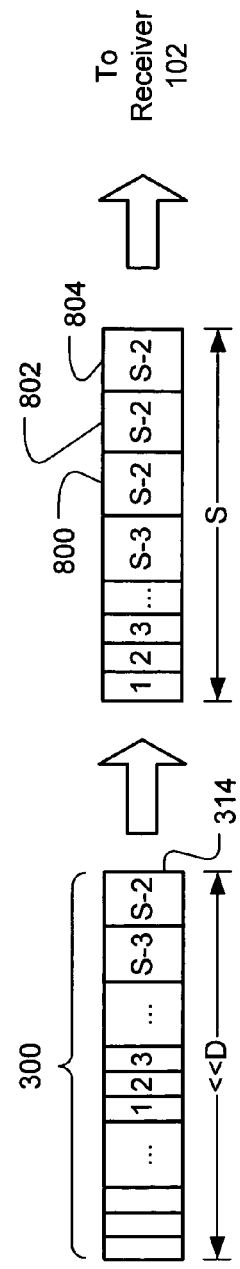

Optionally, as shown in FIG. 8, if the FIFO 300 contains significantly fewer than D sample data units (for example, if the FIFO contains two fewer than D sample data units or fewer than 80% of D sample data units), fewer sample data units are removed from the head 314 of the FIFO 300 than shown in FIG. 6. For example, two fewer than S sample data units are removed. One of the sample data units (S−2) removed from the FIFO 300 is repeated twice, i.e. provided three times, (with or without compression) to the receiver 102, as indicated at 800, 802 and 804. In this example, two fewer than D can be considered another predetermined threshold value T(LL), and if the FIFO 300 contains fewer than T(LL) sample data units, the FIFO can be considered to meet a criterion.

Alternatively, each of two individual sample data units (such as (S−3) and (S−2)) that are removed from the FIFO 300 can be repeated, i.e. provided twice, each (with or without compression) to the receiver 102. Alternatively, instead of repeating two of the sample data units that were removed from the FIFO 300, one or more sample data units that are still in the FIFO can be copied and used as the added sample data units, or a combination of sample data units that have been removed from the FIFO and sample data units that are still in the FIFO can be copied and used as the added sample data units.

In a manner similar to that described above with reference to FIG. 7, if the FIFO 300 contains significantly more than D sample data units (for example, if the FIFO contains two more than D sample data units or more than 120% of D sample data units), more sample data units are removed from the head 314 of the FIFO 300 than shown in FIG. 7. For example, two more than S sample data units are removed. Two of the sample data units are discarded, and S sample data units are provided to the receiver 102. In this example, two more than D can be considered another predetermined threshold value T(HH).

Alternatively or additionally, sample data units can be discarded from the FIFO 300 at other times. For example, periodically or when a packet is received from the sender 104, the jitter buffer manager 302 can ascertain the number N of sample data units in the FIFO 300 and, if appropriate, discard one or more of the sample data units.

Although operation of the sample jitter buffer 100 has been described in terms of repeating or discarding one or two sample data units, other numbers, such as five and ten, of sample data units can be repeated or discarded. The number of sample data units discarded from the FIFO 300 can also depend on the number N of sample data units currently in the FIFO. Furthermore, the discarded sample data units can be removed from disparate locations in the FIFO 300 to avoid creating large discontinuities in the signal.

In the examples described with reference to FIGS. 5-7, the desired number of sample data units in the FIFO 300 is a single number (threshold) D. If the actual number N of sample data units in the FIFO 300 is greater than or less than D, one or more sample data units are discarded or repeated. In other embodiments, a range of desirable numbers of sample data units in the FIFO 300 can be defined, such as by defining a lower threshold T(L) and an upper threshold T(H). In such an embodiment, if the number of sample data units in the FIFO 300 is between T(L) and T(H), S sample data units are removed from the head 314 of the FIFO and provided to the receiver 102. If the number of sample data units in the FIFO 300 is below T(L), one or more sample data units are repeated, and if the number of sample data units in the FIFO is above T(H), one or more sample data units are discarded. Similarly, in the examples described with reference to FIGS. 7 and 8, the threshold T(LL) representing significantly fewer than D sample data units and the threshold T(HH) representing significantly more than D sample data units can be defined in terms of T(L) and T(H). Optionally, additional thresholds respectively above and below T(HH) and T(LL) can be defined, and yet more sample data units can be discarded or replicated if the FIFO 300 contains more or fewer than the additional thresholds of sample data units. If the FIFO 300 contains more than, fewer than, at least or at most one of these thresholds, the FIFO can be considered to meet a respective criterion.

Optionally, when a sample data unit is to be discarded or repeated, the FIFO 300 is searched for sample data units that represent silence (in an audio signal) or another predefined value (such as an all-black or all-white frame of a video signal), a set of identical contiguous sample data units or group of sample data units (such as a set of contiguous non-changing frames of a non-changing scene in a video signal) or another non-changing or minimally changing portion of the signal (collectively hereinafter referred to as "unimportant sample data unit(s)"). "Minimally changing" can be defined, for example, by a predetermined maximum difference between adjacent sample data units, samples, frames, etc. If one or more sample data units are to be discarded, the system preferentially discards an appropriate number of unimportant sample data unit(s). Consequently, relatively insignificant portions of the signal are discarded, and much of the meaningful content of the signal is preserved. If one or more sample data units are to be repeated, the system preferentially repeats an appropriate number of unimportant sample data unit(s). Consequently, the added portion of the signal is relatively inconspicuous.

As discussed with respect to FIG. 7, sample data units are discarded from the head 314 of the FIFO 300. Alternatively or in addition, sample data units, such as unimportant sample data units, are discarded from any location within the FIFO 300. For example, sample data units are discarded from any position within the set of sample data units removed from the head 314 of the FIFO 300 for forwarding to the receiver 102, not necessarily from the first sample data unit(s) (S+1) removed from the head of the FIFO, as shown in FIG. 7. Sample data units can be discarded from the middle or tail 308 of the FIFO 300, such as a portion of the FIFO that contains one or more unimportant sample data units, not necessarily from the set of sample data units removed from the head 314 of the FIFO 300 for forwarding to the receiver 102. As noted, sample data units can be discarded at any time, not necessarily only when sample data units are removed from the FIFO 300 for forwarding to the receiver 102. Similarly, sample data units, such as unimportant sample data units, can be repeated at any location within the FIFO 300 or within the sample data units removed from the head 314 of the FIFO for forwarding to the receiver 102. In addition, sample data units can be repeated in the FIFO 300 at any time.

Figure 9:
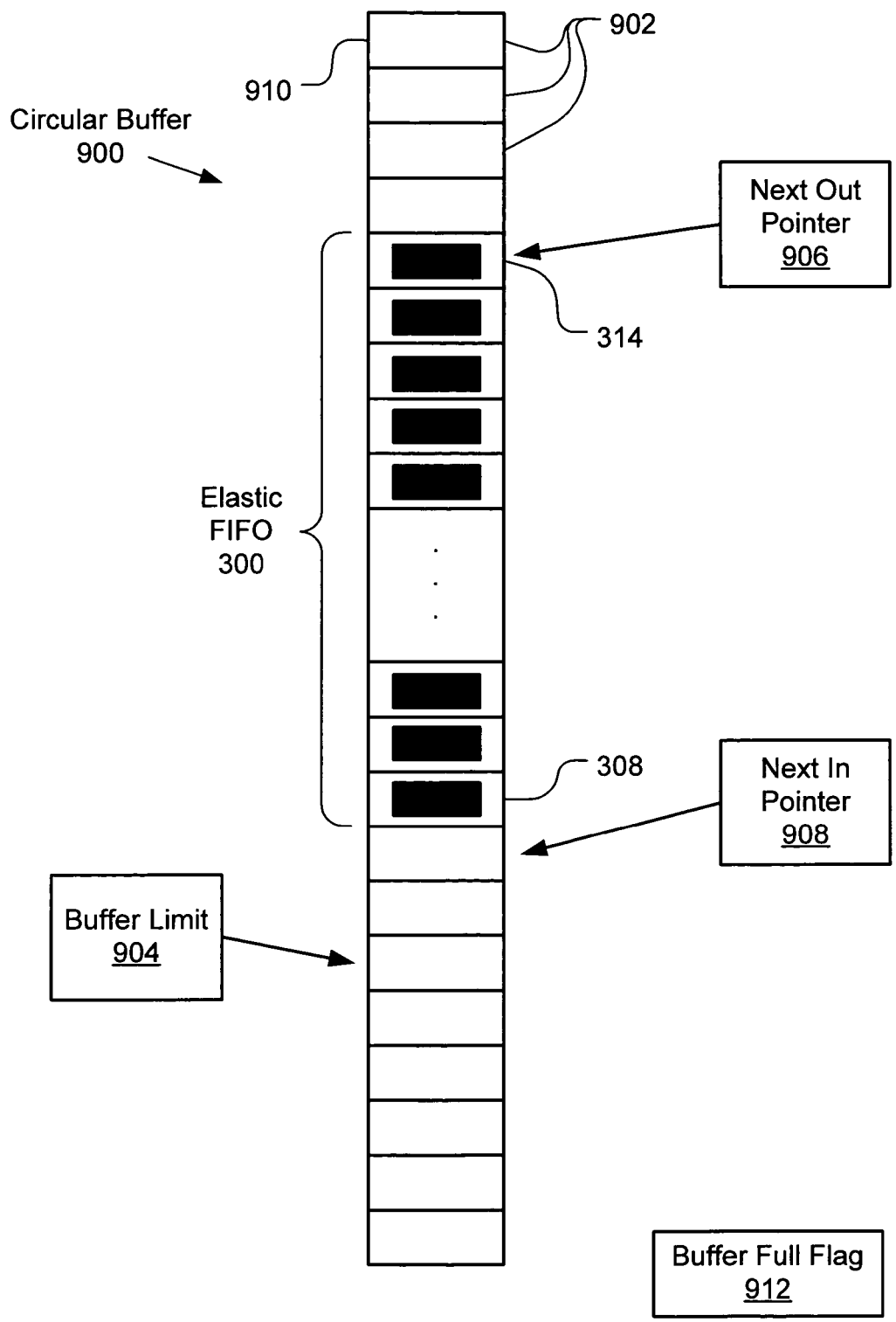
FIGS. 9-11 are block diagrams of a ring buffer implementation of a FIFO in the sample jitter buffers of FIGS. 3 and 4.
Figures 10, 11:
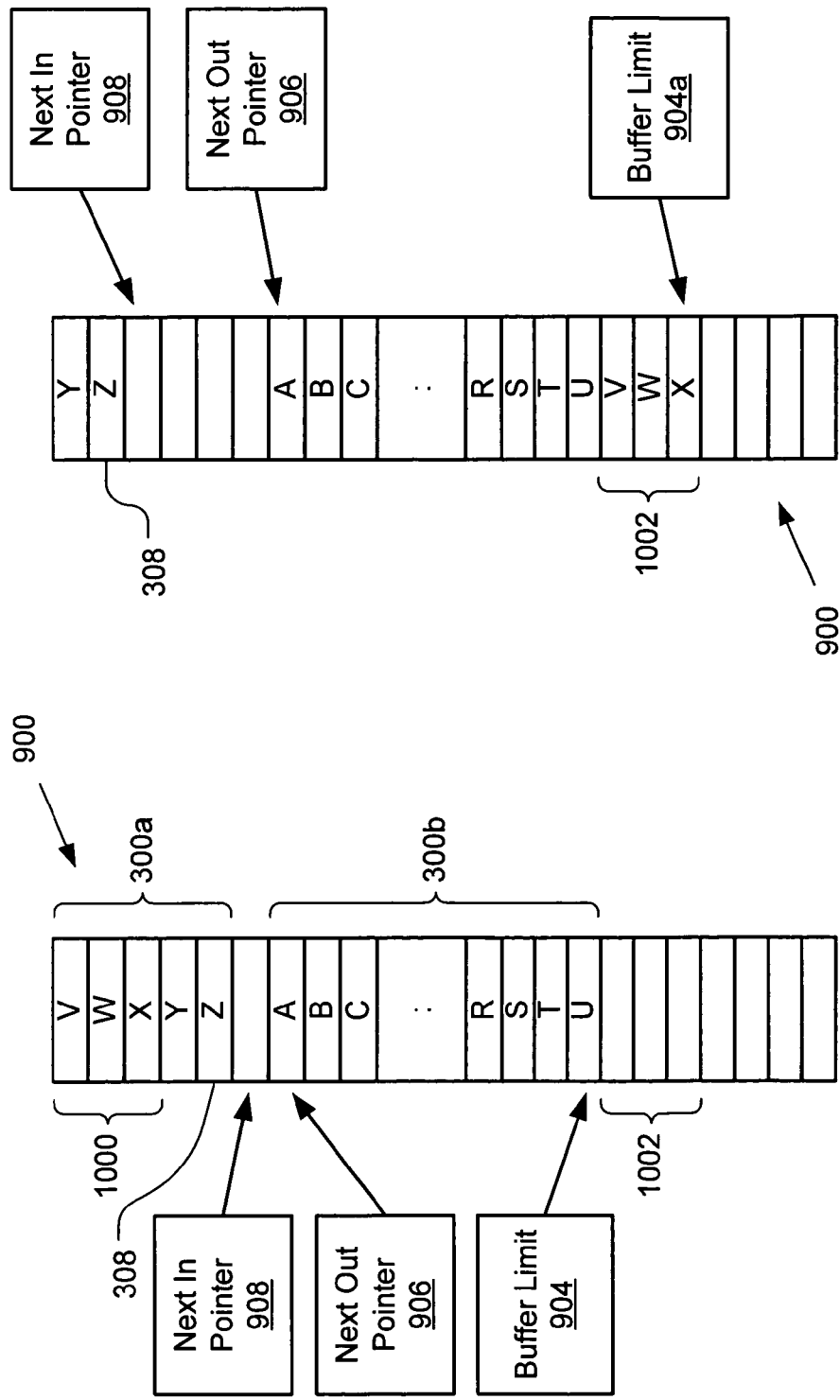

As noted, the FIFO 300 can be implemented as a circular buffer or other suitable hardware or software structure. FIGS. 9-11 illustrate one implementation of the FIFO 300 as a circular buffer 900. As shown in FIG. 9, the circular buffer 900 includes a predetermined number of cells 902. The number of cells 902 can be fixed or dynamic. Some or all of the cells 902 are occupied by sample data units. The maximum number of cells 902 in the circular buffer 900 that can be occupied by sample data units is represented by a "buffer limit" 904. The buffer limit 904 can be increased or decreased as needed, such as in response to measured jitter in the network 106, the number of sample data units that have been replicated and/or discarded over a period of time or the quality of service requested by the receiver 102.

The occupied cells of the circular buffer 900 constitute the FIFO 300. The head 314 of the FIFO 300 is indicated by a "next out pointer" 906. When the FIFO 300 is called upon to provide one or more sample data units, the next out pointer 906 is used to locate the first sample data unit that is removed from the FIFO. As sample data units are removed from the FIFO 300, the next out pointer 906 is advanced to point to the new head of the FIFO.

A "next in pointer" 908 points to the next available cell in the circular buffer 900. When sample data units are to be added to the FIFO 300, the next in pointer 908 is used to locate the first available cell in the circular buffer 900. As sample data units are added to the tail 308 of the FIFO 300, the next in pointer 908 is advanced.

If either the next out pointer 906 or the next in pointer 908 reaches the buffer limit 904, the pointer "wraps" back to the first cell 910 of the circular buffer 900. A completely empty FIFO 300 is indicated by identical values in the next out pointer 906 and the next in pointer 908. Similarly, a completely full FIFO 300 is indicated by identical values in the next out pointer 906 and the next in pointer 908. Thus, a "buffer full flag" 912 is used to distinguish between these two cases.

As shown in FIG. 10, if the FIFO 300 is full or nearly full, the buffer limit 904 can be raised to a new value 904a to make more cells 1100 available for the FIFO, as shown in FIG. 11. After the buffer limit 904a is raised, the tail 308 of the FIFO 300 and some sample data units 1000 adjacent the tail may need to be relocated, as shown in FIG. 11.

Although exemplary embodiments have been described with reference to Internet telephony, videoconferencing and the Real-time Transfer Protocol (RTP), other embodiments can be used with other packetized media, signals, networks and protocols, such as cellular telephone networks and the Global System for Mobile Communication (GSM).

The functions described above can be performed by a central processing unit (CPU) executing instructions stored in a memory, such as a random access memory (RAM), read-only memory (ROM), flash memory or any other memory suitable for storing control software or other instructions and data. Those skilled in the art should readily appreciate that instructions or programs defining the functions of the present invention can be delivered to a processor in many forms, including, but not limited to, information permanently stored on non-writable storage media (e.g. read only memory devices within a computer such as ROM or CD-ROM disks readable by a computer I/O attachment), information alterably stored on writable storage media (e.g. floppy disks and hard drives) or information conveyed to a computer through communication media, such as computer networks. In addition, while the invention may be embodied in software, the functions necessary to implement the invention may alternatively be embodied in part or in whole using firmware and/or hardware components, such as Application Specific Integrated Circuits (ASICs), Field-Programmable Gate Arrays (FPGAs) or other hardware or some combination of hardware, software and/or firmware components.

While the invention is described through the above-described exemplary embodiments, it will be understood by those of ordinary skill in the art that modifications to, variations of and combinations and sub-combinations of the illustrated embodiments may be made without departing from the inventive concepts disclosed herein. Moreover, while the preferred embodiments are described in connection with various illustrative data structures, one skilled in the art will recognize that the system may be embodied using a variety of data structures. Accordingly, the invention should not be viewed as limited, except by the scope and spirit of the appended claims.

What is claimed is:

1. A method of managing a buffer, comprising the steps of:
receiving a plurality of groups of data;
storing at least some of the received data in the buffer;
detecting an amount of data in the buffer;
removing at least a first subset of the data from the buffer; and
providing at least the first subset of the data to a receiver, including, if the detected amount of data in the buffer meets a first criterion, repeating at least some of the data provided to the receiver,
wherein repeating at least some of the data comprises:
copying at least some of the received data in the buffer to obtain at least one data copy, without removing the copied data from the buffer; and
inserting the data copy at a predetermined position in the first subset of the data provided to the receiver.

2. The method of claim 1, wherein repeating at least some of the data further comprises:
if the amount of data in the buffer meets a second criterion, repeating none of the data in the first subset; and
if the amount of data in the buffer meets a third criterion, repeating a first predetermined amount of the data in the first subset a first number of times.

3. The method of claim 2, wherein repeating the first predetermined amount of the data in the first subset comprises repeating the first predetermined amount of data in the first subset once.

4. The method of claim 2, wherein repeating the first predetermined amount of the data in the first subset comprises repeating one byte.

5. The method of claim 2, wherein repeating the first predetermined amount of the data in the first subset comprises repeating one sample.

6. The method of claim 2, wherein repeating the first predetermined amount of the data in the first subset comprises repeating one sample data unit.

7. The method of claim 2, wherein repeating the first predetermined amount of the data in the first subset comprises repeating one byte of data in the first subset once.

8. The method of claim 2, wherein repeating at least some of the data further comprises:
if the amount of data in the buffer meets a fourth criterion, repeating the first predetermined amount of the data in the first subset a second number of times, larger than the first number of times.

9. The method of claim 8, wherein repeating the first predetermined amount of the data in the first subset comprises repeating the first predetermined amount of data in the first subset twice.

10. The method of claim 8, wherein repeating the first predetermined amount of the data in the first subset comprises repeating one byte of data in the first subset twice.

11. The method of claim 2, wherein repeating at least some of the data further comprises:
if the amount of data in the buffer meets a fifth criterion, repeating a second predetermined amount of the data, larger than the first predetermined amount of data, in the first subset.

12. The method of claim 11, wherein the first predetermined amount of the data in the first subset comprises one byte.

13. The method of claim 11, wherein the first predetermined amount of the data in the first subset comprises one sample.

14. The method of claim 11, wherein the first predetermined amount of the data in the first subset comprises one sample data unit.

15. The method of claim 1, wherein repeating at least some of the data further comprises:
locating at least one unimportant sample data unit in the first subset; and
repeating the located at least one unimportant sample data unit.

16. The method of claim 15, wherein the at least one unimportant sample data unit contains a predetermined value.

17. The method of claim 15, wherein the at least one unimportant sample data unit represents silence in a corresponding audio signal.

18. The method of claim 15, wherein the at least one unimportant sample data unit represents a minimally-changing portion of a corresponding signal.

19. The method of claim 1, further comprising:
at regular intervals, providing a successive at least one first subset of the data in the buffer to the receiver, including, if the amount of data in the buffer meets the first criterion, repeating at least some of the data in the successive first subsets.

20. The method of claim 19, wherein providing the at least one first subset of the data in the buffer to the receiver comprises sending the at least one first subset of data to the receiver according to a real-time protocol.

21. The method of claim 1, further comprising:
if the detected amount of data in the buffer meets a sixth criterion, discarding at least some of the data in the first subset, the amount of data discarded being less than the size of each of the plurality of received groups of data.

22. The method of claim 21, wherein the amount of data discarded depends on the amount of data in the buffer.

23. The method of claim 21, wherein discarding at least some of the data comprises:
if the detected amount of data in the buffer meets a seventh criterion, discarding none of the data in the first subset; and
if the detected amount of data in the buffer meets an eighth criterion, discarding a third predetermined amount of data in the first subset.

24. The method of claim 23, wherein discarding the third predetermined amount of data in the first subset comprises discarding one byte.

25. The method of claim 23, wherein discarding the third predetermined amount of data in the first subset comprises discarding one sample.

26. The method of claim 23, wherein discarding the third predetermined amount of data in the first subset comprises discarding one sample data unit.

27. The method of claim 23, wherein discarding at least some of the data further comprises:
    if the detected amount of data in the buffer meets a ninth criterion, discarding a fourth predetermined amount, larger than the third predetermined amount, of data in the first subset.

28. The method of claim 27, wherein the third predetermined amount of data comprises one byte.

29. The method of claim 27, wherein the third predetermined amount of data comprises one sample.

30. The method of claim 27, wherein the third predetermined amount of data comprises one sample data unit.

31. The method of claim 21, wherein discarding at least some of the data comprises:
    locating at least one unimportant sample data unit in the first subset; and
    discarding the located at least one unimportant sample data unit.

32. The method of claim 31, wherein the at least one unimportant sample data unit contains a predetermined value.

33. The method of claim 31, wherein the at least one unimportant sample data unit represents silence in a corresponding audio signal.

34. The method of claim 31, wherein the at least one unimportant sample data unit represents a minimally-changing portion of a corresponding signal.

35. The method of claim 1, wherein storing at least some of the received data in the buffer comprises:
    if at least a portion of one of the received groups of data is older than data that was provided to the receiver prior to receiving the one of the received groups of data, discarding the at least a portion of the one of the received groups of data and storing the remainder, if any, of the one of the received groups of data in the buffer.

36. The method of claim 1, further comprising:
    decoding the received groups of data; and
    wherein storing at least some of the received data comprises storing the decoded data in the buffer.

37. The method of claim 36, further comprising coding the data provided to the receiver before providing the data to the receiver.

38. The method of claim 1, wherein an amount of data repeated depends on the amount of data in the buffer.

39. The method of claim 1, wherein repeating the at least some of the data further comprises repeating one byte.

40. The method of claim 1, wherein repeating the at least some of the data further comprises repeating one sample.

41. The method of claim 1, wherein repeating the at least some of the data further comprises repeating one sample data unit.

42. A method of managing a buffer, comprising the steps of:
    receiving a plurality of groups of data;
    storing at least some of the received data in the buffer;
    detecting an amount of data in the buffer;
    if the detected amount of data in the buffer meets a first criterion;
        removing at least a first subset of the data from the buffer;
        discarding at least some of the data in the first subset of the data to obtain a second subset of the data,
            wherein discarding at least some of the data comprises discarding a first predetermined amount of the data in the first subset of the data, the first predetermined amount of the data in the first subset that is discarded being less than the size of each of the received plurality of groups of data; and
        providing the second subset of the data to a receiver; and
    if the detected amount of data in the buffer meets a second criterion;
        removing at least the first subset of the data from the buffer;
        copying at least some of the received plurality of groups of data in the buffer to obtain at least one data copy, without removing the copied data from the buffer;
        inserting the data copy at a predetermined position in the first subset of the data to obtain the second subset of the data; and
        providing the second subset of the data to the receiver.

43. The method of claim 42, wherein the first predetermined amount of the data in the first subset that is discarded depends on the amount of data in the buffer.

44. The method of claim 42, wherein discarding at least some of the data further comprises:
    if the detected amount of data in the buffer meets a third criterion, discarding none of the data in the first subset of the data; and
    if the detected amount of data in the buffer meets a fourth criterion, discarding a second predetermined amount of the data in the first subset of the data.

45. The method of claim 44, wherein discarding the second predetermined amount of the data in the first subset of the data comprises discarding one byte.

46. The method of claim 44, wherein discarding the second predetermined amount of the data in the first subset of the data comprises discarding one sample.

47. The method of claim 44, wherein discarding the second predetermined amount of the data in the first subset of the data comprises discarding one sample data unit.

48. The method of claim 44, wherein discarding at least some of the data further comprises:
    if the detected amount of data in the buffer meets a fifth criterion, discarding a third predetermined amount of the data in the first subset of the data, the third predetermined amount of the data in the first subset that is discarded being larger than the second predetermined amount of the data in the first subset of the data.

49. The method of claim 48, wherein the second predetermined amount of the data in the first subset of the data comprises one byte.

50. The method of claim 48, wherein the second predetermined amount of the data in the first subset of the data comprises one sample.

51. The method of claim 48, wherein the second predetermined amount of the data in the first subset of the data comprises one sample data unit.

52. The method of claim 48, wherein discarding the third predetermined amount of the data comprises discarding two bytes.

53. The method of claim 48, wherein discarding the third predetermined amount of the data comprises discarding two sample data units.

54. The method of claim 42, wherein discarding at least some of the data further comprises:
    locating at least one unimportant sample data unit in the first subset of the data; and
    discarding the located at least one unimportant sample data unit in the first subset of the data.

55. The method of claim 54, wherein the at least one unimportant sample data unit contains a predetermined value.

56. The method of claim 54, wherein the at least one unimportant sample data unit represents silence in a corresponding audio signal.

57. The method of claim 54, wherein the at least one unimportant sample data unit represents a minimally-changing portion of a corresponding signal.

58. A method of managing a buffer, comprising the steps of:
receiving a plurality of groups of data;
storing at least some of the received data in the buffer;
detecting an amount of data in the buffer; and
providing data to a receiver, comprising:
if the detected amount of data in the buffer meets a first criterion:
designating a first portion of the data in the buffer; and
providing the designated data to the receiver; and
if the detected amount of data in the buffer meets a second criterion:
designating a second portion, smaller than the first portion, of the data in the buffer;
producing a first replica of at least a subset of the second designated portion of the data in the buffer, wherein producing the first replica comprises copying at least the subset of the second designated portion of the data in the buffer to produce the first replica; and
providing the second designated portion of the data and the first replica to the receiver, without removing the copied data used to produce the first replica from the buffer.

59. The method of claim 58, wherein providing the data to the receiver further comprises:
if the detected amount of data in the buffer meets a third criterion:
designating a third portion, smaller than the second portion, of the data in the buffer;
producing a second replica, larger than the first replica, of at least a subset of the third designated portion of the data in the buffer; and
providing the third designated portion of the data and the second replica to the receiver.

60. The method of claim 59, further comprising:
if the detected amount of data in the buffer meets a fourth criterion, discarding none of the data in the buffer; and
if the detected amount of data in the buffer meets a fifth criterion, discarding a first predetermined amount of data from the buffer, the first predetermined amount of the data in the buffer that is discarded being less than the size of each of the received plurality of groups of data.

61. The method of claim 60, further comprising:
if the detected amount of data in the buffer meets a sixth criterion, discarding a second predetermined amount of data from the buffer, the second predetermined amount of the data in the buffer that is discarded being larger than the first predetermined amount but less than the size of each of the received plurality of groups of data.

62. The method of claim 61, wherein providing the data to the receiver further comprises providing groups of data to the receiver, each group of data provided to the receiver containing the same amount of data as each of the received plurality of groups of data.

63. The method of claim 62, wherein storing at least some of the received data in the buffer comprises:
if at least a portion of one of the received plurality of groups of data is older than data that was provided to the receiver prior to receiving the one of the received plurality of groups of data, discarding the at least a portion of the one of the received plurality of groups of data, and storing a remaining portion, if any, of the one of the received plurality of groups of data in the buffer.

64. The method of claim 63, further comprising:
decoding the received plurality of groups of data; and
wherein storing at least some of the received data in the buffer comprises storing the decoded data in the buffer.

65. The method of claim 64, further comprising coding the data provided to the receiver before providing the data to the receiver.

66. A method of managing a buffer, comprising:
receiving a plurality of groups of data;
storing at least some of the received data in the buffer;
detecting an amount of data in the buffer; and
providing data to a receiver, comprising:
if the detected amount of data in the buffer meets a first criterion:
designating a first portion of the data in the buffer; and
providing the designated first portion of the data to the receiver; and
if the detected amount of data in the buffer meets a second criterion:
designating a second portion, smaller than the first portion, of the data in the buffer;
designating a third portion of the data in the buffer;
copying the designated third portion of the data to obtain a replica of the designated third portion of the data;
providing the designated second portion of the data and the replica of the designated third portion of the data to the receiver, without removing the designated third portion of the data from the buffer; and
subsequently providing the designated third portion of the data to the receiver along with data other than the designated second portion of the data.

67. The method of claim 66, wherein providing the data to the receiver further comprises:
if the detected amount of data in the buffer meets a third criterion:
designating a fourth portion, smaller than the second portion, of the data in the buffer;
designating a fifth portion of the data in the buffer; and
providing the designated fourth and fifth portions of the data to the receiver.

68. The method of claim 66, further comprising:
if the detected amount of data in the buffer meets a fourth criterion, discarding none of the data in the buffer; and
if the detected amount of data in the buffer meets a fifth criterion, discarding a first predetermined amount of data in the buffer, the first predetermined amount of the data in the buffer that is discarded being less than the size of each of the received plurality of groups of data.

69. The method of claim 66, wherein storing at least some of the received data in the buffer comprises:
if at least a portion of one of the received plurality of groups of data is older than data that was provided to the receiver prior to receiving the one of the received plurality of groups of data, discarding the at least a portion of the one of the received plurality of groups of data, and storing a remaining portion, if any, of the one of the received plurality of the groups of data in the buffer.

* * * * *